United States Patent
Mitamura et al.

(10) Patent No.: US 6,478,894 B1
(45) Date of Patent: Nov. 12, 2002

(54) ROLLING BEARING

(75) Inventors: Nobuaki Mitamura, Kanagawa (JP); Kazuo Sekino, Kanagawa (JP); Yasuo Murakami, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/358,554

(22) Filed: Jul. 22, 1999

(30) Foreign Application Priority Data

Jul. 28, 1998 (JP) ............................. 10-212796

(51) Int. Cl.$^7$ ............................................. C22C 38/22
(52) U.S. Cl. ................... 148/328; 148/334; 29/724; 508/105; 508/107
(58) Field of Search ................. 148/218, 622, 148/328, 334; 29/724; 508/105, 107

(56) References Cited

U.S. PATENT DOCUMENTS

| | | | |
|---|---|---|---|
| 3,859,146 A | * | 1/1975 | Habrovec et al. ............ 148/333 |
| 4,581,079 A | * | 4/1986 | Borik ......................... 148/653 |
| 4,871,268 A | | 10/1989 | Furumura et al. .......... 384/492 |
| 4,992,111 A | | 2/1991 | Yamada et al. ............. 148/12.4 |
| 5,085,733 A | | 2/1992 | Mitamura ................... 148/319 |
| 5,352,303 A | | 10/1994 | Murakami et al. .......... 148/318 |
| 5,626,974 A | | 5/1997 | Mitamura .................... 428/698 |
| 5,660,647 A | | 8/1997 | Mitamura et al. ........... 148/319 |
| 5,725,690 A | * | 3/1998 | Ochi et al. ................... 148/320 |
| 5,900,077 A | * | 5/1999 | McVicker et al. ........... 148/334 |

FOREIGN PATENT DOCUMENTS

| | | |
|---|---|---|
| GB | 2235698 | 3/1991 |
| GB | A 2292389 | 2/1996 |
| GB | A 2293214 | 3/1996 |
| JP | 60208452 A | * 10/1985 |
| JP | 5-25609 | 2/1993 |

* cited by examiner

Primary Examiner—John Sheehan
Assistant Examiner—Andrew L. Oltmans
(74) Attorney, Agent, or Firm—Sughrue Mion, PLLC

(57) ABSTRACT

At least any one of a bearing member (inner race, outer race and rolling element) is formed with a steel material containing 0.2 to 1.2 wt % of C, 0.7 to 1.5 wt % of Si, 0.5 to 1.5 wt % of Mo, 0.5 to 2.0 wt % of Cr, and 12 ppm or less of O. The bearing member is treated with carbonitriding, and thereafter, quenching and tempering so as to provide carbon concentration in the steel surface being 0.8 to 1.3 wt % and nitrogen concentration on the same being 0.2 to 0.8 wt %.

11 Claims, 7 Drawing Sheets

ROLLING BEARING

BACKGROUND OF THE INVENTION

1. Field of the Invention

The present invention relates to a rolling bearing to be suitably used for high speed rotation as superchargers or metal machine tools.

2. Description of the Related Art

Since the rolling bearing is repeatedly effected with shearing stress at race surfaces and rolling surfaces under high surface pressure, even in case of no especial abnormal conditions, pitching or flaking occur some day due to rolling fatigue, and its life ceases before long. For lengthening the rolling fatigue life, high carbon Cr bearing steel as SUJ2 has conventionally been used as a material for forming the bearing member. Otherwise, developments of steel materials enabling to lengthen the rolling fatigue life have energetically been made (see JP-A-5-25609, hereinafter, "JP-A" means "Unexamined Japanese Patent Publication (kokai)").

However, when the rolling bearing is served under the high rotation as $d_m n$ value (the product of an average size $d_m$ of an inner diameter and an outer diameter of the bearing ≈ the diameter Dp (mm) of the pitch circle of the rolling element and the rotation number n (rpm)) being $1.0 \times 10^6$ or more, since PV value designating friction conditions (P: surface pressure and V: velocity) is high, the sliding friction caused between the rolling element and the raceway surface, such problems as friction or seizing occur before going to the rolling fatigue life. This is because, for example, in a ball bearing, the friction is large by the spin sliding, and in a roller bearing, the friction between the roller and flanges of the inner and outer races is large. In particular, when seizing occurs in the bearing, as troubles of a machine itself furnishing with this bearing are possibly induced, prevention of seizing is very important.

For solving such problems, it has been proposed to form the inner and outer races and the rolling element with heat resistant alloy steels as M50 or the like. However, in this method, abrasion resistance is improved, but seizing resistance is hardly effective. Accordingly, there have been proposed a method of improving the seizing resistance by forming films of desired materials on the raceway surfaces and the surfaces of the rolling elements fabricated with the heat resistant alloy steel as M50, or a method of forming the inner and outer races with ceramics. Further, it has been proposed to heighten the seizing resistant property by improving a lubricating method.

However, among the conventional techniques, the methods of forming the films or employing the ceramics as the materials forming the bearing members bring about high material cost and reduce productivity, resulting in high production cost. Further, the improvement of the lubricating method cannot be often used depending upon machines equipped with the bearings.

SUMMARY OF THE INVENTION

It is an object of the present invention to provide a rolling bearing enabling to prevent abrasion or seizing even when these are served even under the high speed rotation of the $d_m n$ value being $1.0 \times 10^6$ or more, and are low of the production cost.

In the present invention, a rolling bearing comprises an inner race, an outer race and a plural rolling elements. At least one of the inner race, the outer face and the rolling elements comprises a steel element containing: 0.2 to 1.2 wt % of C; 0.7 to 1.5 wt % of Si; 0.5 to 1.5 wt % of Mo; 0.5 to 2.0 wt % of Cr; and 12 ppm or less of O. The at least one of the inner race, the outer race and the rolling elements is carbonitrided and thereafter quenched and tempered so that carbon concentration on a surface of the steel element is in the range of 0.8 to 1.3 wt % and nitrogen concentration on the surface of the steel element is 0.2 to 0.8 wt %.

Further, in the present invention, a rolling bearing comprises an inner race, an outer race and a plural rolling elements. At least one of the inner race, the outer face and the rolling elements comprises a steel element containing: 0.2 to 1.2 wt % of C; 0.7 to 1.5 wt % of Si; 0.5 to 1.5 wt % of Mo; 0.5 to 2.0 wt % of Cr; 0.1 to 0.3 wt % of Ti and 12 ppm or less of O. The steel element is solution heat-treated, and thereafter, at least one of the inner race, the outer race and the rolling elements is quenched and tempered so that TiC having a size of 0.1 μm or less is precipitated on a surface of said steel element.

DETAILED DESCRIPTION OF THE INVENTION

Detailed description of the present invention will be described as follows referring to the accompanying drawings.

Inventors made earnest studies for solving the conventional problems as described above, obtained the following findings, and accomplished the present invention.

Figure 1A:
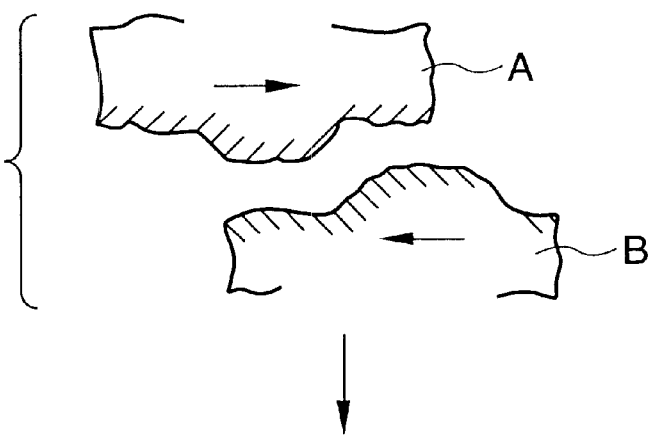
FIGS. 1A to 1D are views for explaining the generating progress of adhesion by contact between steel made parts.
Figure 1B:
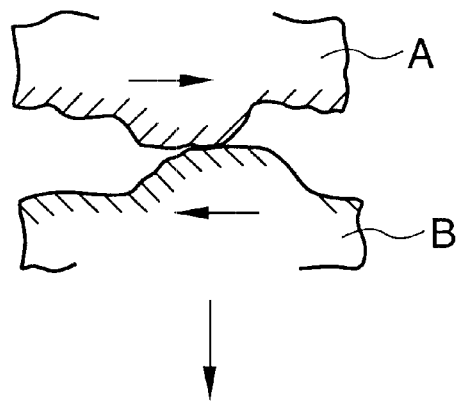
Figure 1C:
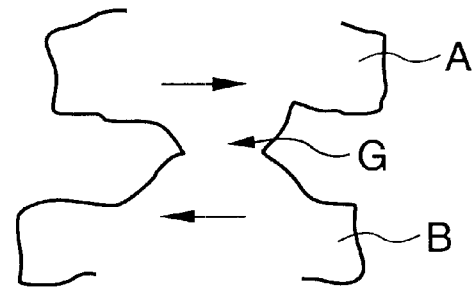
Figure 1D:
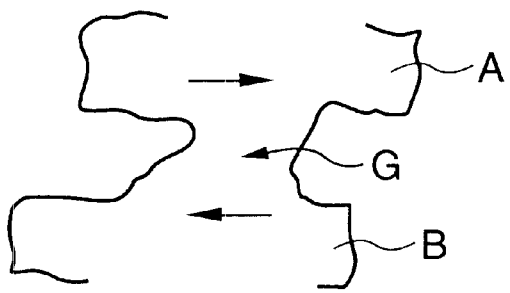

The seizing is caused by adhesion happening at friction between steels. It is assumed that as the adhesion becomes larger to a certain extent, the friction force is large accordingly, and when the friction force finally exceeds a slide promoting force, resistance against the relative sliding becomes very large and invites the seizing. The causing progress of the adhesion will be explained with reference to FIGS. 1A to 1D. Steel made members A and B move oppositely (FIG. 1A), when convexs (fine protrusions) of the members contact each other (FIG. 1B), the convex and the convex cause adhesion as a plastic deformation progresses (FIG. 1C), and the adhering parts become larger while the plastic deformation goes on (FIG. 1D).

Accordingly, for suppressing occurrence of the adhesion while preventing the generated adhesion from growing large, it was found that it is effective that (1) matrix strength at high temperature is made high to check the plastic deformation, and (2) fine precipitated substances are generated in the matrix so as to check plastic flowing, and it is effective to break the adhered part into small sizes. Specifically, as to (1), it was found that it particularly effective to add proper amounts of Si and Mo as elements of an alloyed steel to be employed. As to (2), by performing the carbonitriding treatment, fine nitride and carbon nitride are formed on the surface, and it was found that it effective to add the proper amount of Ti as the element of the alloyed steel and carry out the solution heat treatment to precipitate fine TiC. Further, depending upon the method (1) only or the method (2) only, it is merely effective for heightening the abrasion resistance to a certain extent. However, if combining the method (1) and the method (2), it was found that the resizing resistance could be considerably improved.

From these findings, a rolling bearing of the first aspect according to the present invention contains 0.2 to 1.2 wt % of C, 0.7 to 1.5 wt % of Si, 0.5 to 1.5 wt % of Mo and 0.5 to 2.0 wt % of Cr in at least one of an inner race, an outer race and a rolling element, being formed with an steel material containing 12 ppm or less of O, carbon concentration on the surface of the steel being in the range of 0.8 to 1.3 wt % and nitrogen concentration on the same being 0.2 to 0.8 wt % by carbonitriding, followed by quenching and tempering.

A rolling bearing of the second aspect according to the present invention contains 0.2 to 1.2 wt % of C, 0.7 to 1.5 wt % of Si, 0.5 to 1.5 wt % of Mo, 0.5 to 2.0 wt % of Cr and 0.1 to 0.3 wt % of Ti in at least one of an inner race, an outer race and a rolling element, being formed with an steel material containing 12 ppm or less of O, and 0.1 $\mu$m or less of TiC precipitated on the surface of the steel by solution heat treatment, followed by quenching and tempering.

The rolling bearing of the first and second aspect according to the present invention can be served under the high rotation as $d_m n$ value (the product of an average size $d_m$ of an inner diameter and an outer diameter of the bearing ≈ the diameter Dp (mm) of the pitch circle of the rolling element and the rotation number n (rpm)) being $1.0 \times 10^6$ or more.

Further explanation will be made to working of each element of the steel material to be used in the present invention and critical significance for defining each numerical value.

[C: 0.2 to 1.2 wt %]

C is an element for converting a basis material to martensite by the quenching and tempering treatments and imparting hardness to the steel, and an indispensable element for providing the rolling fatigue strength required as the bearing. In case that the carbon concentration in the bearing surface is low, the rolling fatigue strength is made low. When the C content in the material is lower than the predetermined range of 0.6 to 0.8 wt %, it is necessary to carry out the carbonitriding treatment to increase the surface carbon concentration above the predetermined amount. The lower of the C content in the material, the longer the carbonitriding time is. When the C content is 0.2 wt % or more, the treating time is short, enabling to lower the cost.

In contrast, if C content is much in the material, large carbides are precipitated as defects to shorten the rolling fatigue life. When C content exceeds 1.2 wt %, these large carbides are easily precipitated. Thus, the upper limit is defined to be 1.2 wt %.

[Si: 0.7 to 1.5 wt %]

Si is an element to strength the solid solution, works to heighten softening resistance by tempering, and increase strength at high temperature. This is effective for heightening the nitrogen concentration on the surface at a time of carbonitriding. As results of the inventors' study, if Si is 0.7 wt % or more, it was found that the seizing resistance was remarkably improved comparing with a case of less than 0.7 wt %. As to the upper limit, if exceeding 1.5 wt %, as the workability is probably lowered, the upper limit is defined to be 1.5 wt %.

[Mo: 0.5 to 1.5 wt %]

Mo is an element to works to heighten softening resistance by tempering, and increase strength at high temperature. This works to make cabides and carbon nitride precipitated at a time of carbonitriding. As results of inventors' study, if Mo is 0.5 wt % or more, the seizing resistant property was remarkably improved comparing with a case of less than 0.5 wt %. As to the upper limit, if exceeding 1.5 wt %, as the effect by the Mo addition is saturated, the upper limit is defined to be 1.5 wt %. [Cr: 0.5 to 2.0 wt %]

Cr is an element for improving the quenching property, and indispensable for providing strength required to the bearing. This forms carbides in combination with C, and is necessary for generating fine precipitated materials. The lower limit is defined to be 0.5 wt %, since the content of 0.5 wt % or more is necessary for fully precipitating carbides and carbon nitrides.

As to the upper limit, when the Cr content exceeds 2.0 wt %, large carbides are easily precipitated as defects to shorten the rolling fatigue life, and so the upper limit is defined to be 2.0 wt %.

[O: 12 ppm or less]

In case that the O content in the steel material is contained exceedingly 12 ppm, oxide based inclusions are easily formed to considerably reduce the rolling fatigue life. Accordingly, the upper limit of the O content is defined to be 12 ppm or less. This range includes a structure containing no O.

[The Carbon Concentration on the Surface After the Carbonitriding Treatment: 0.8 to 1.3 wt %]

For providing the rolling fatigue strength necessary as the bearing, the surface carbon concentration should be 0.8 wt % or more. If this concentration exceeds 1.3 wt %, large carbides are easily formed as defects to reduce the rolling fatigue life.

[The Nitrogen Concentration on the Surface After the Carbonitriding Treatment: 0.2 to 0.8 wt %]

Nitrogen works to increase the abrasion resistance and the seizing resistance. In particular, for remarkably increasing the seizing resistance, it should be present 0.2 wt % or more on the surface of the bearing material. However, if it exceeds 0.8 wt %, grinding is difficult, decreasing productivity in a grinding process as a finishing process of the bearing.

[Ti: 0.1 to 0.3 wt %]

Ti is an element to precipitate very fine TiC in combination with C. Precipitated TiC of 0.1 μm or less in size is particularly effective for the abrasion resistance and the seizing resistance. For getting such effects, Ti should be contained 0.1 wt % or more. If it is added exceedingly 0.3 wt %, large precipitated TiN or Ti (C+N) are easily formed as defects to reduce the rolling fatigue life. Therefore, the upper limit is defined to be 0.3 wt %.

[Size of precipitated TiC: 0.1 μm or less]

Precipitated TiC appears on the surface of the bearing member, and comparing a case where the precipitated TiC is 0.1 μm or less with a case where it exceeds 0.1 μm, very well seizing resistance can be obtained in the case of 0.1 μm or less.

Figure 14:
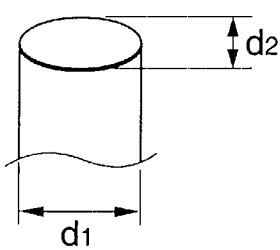
FIG. 14 is an explanation view how to measure the size of precipitated TiC.

FIG. 14 is an explanation view how to measure the size of precipitated TiC. As shown in FIG. 14, when the precipitated TiC is viewed in a plane by a microscope, the size of the precipitated TiC is obtained by (d1+d2)/2, where d1 is short diameter and d2 is long diameter of the precipitated TiC.

According to the rolling bearing of the present invention, the matrix strength at high temperature is high and the plastic deformation can be suppressed. In addition, since fine precipitated substances are generated in the matrix to suppressed the plastic flow and cut the adhered parts into small sizes, the adhesion between the race surfaces of the inner and outer races and the rolling surface of the rolling element is controlled to be small. Consequently, the seizing between both surfaces is reduced.

The present invention will be further explained with reference to specific examples.

[Experiments for Examining the Abrasion Resistance and the Seizing]

As to the abrasion resistance, the steel materials of the compositions shown in Table 1 were used to prepare cylindrical samples for two cylinder abrasion test, and the heat treatment shown in Table 1 was performed to each of samples. The heat treating conditions are as follows.

[Simple Quenching]

The steel material is heated at temperature of 830 to 860° C. for 0.5 to 1.0 hours in an atmosphere (RX gas) controlled not to decarburizing nor carburizing the steel material, followed by oil-quenching, and then tempered 160 to 400° C. for 1.5 to 2.0 hours.

[Carbonitriding]

The steel material is heated at temperature of 840 to 920° C. for 3 to 20 hours in an atmosphere containing a predetermined enriched gas and $NH_3$ gas, followed by the quenching and tempering similarly to the simple quenching. For changing the surface carbon concentration and surface nitrogen concentration, the concentration of the enriched gas and the concentration of the $HN_3$ gas are controlled per each of the samples.

[Proper Solution Heat Treatment]

This treatment is for making sizes of the precipitated TiC 0.1 μm or less, which heats the steel material 1150 to 1350° C. for 1 to 3 hours. When performing this treatment, the simple quenching and the subsequent quenching and tempering are carried out similarly to the above procedure.

TABLE 1

| | Materials | | | | | | | | | | | |
|---|---|---|---|---|---|---|---|---|---|---|---|---|
| | Alloying elements (wt %) | | | | | | Proper solution heat treatment | Minimum precipitated substances (TiC) size (μm) | Heat treatment | | | |
| No. | C | Si | Mo | Cr | O (ppm) | Ti | | | Treatment | Surface C % | Surface N % | Contents |
| Conventional example | | | | | | | | | | | | |
| A-1 | 1.00 | 0.25 | — | 1.50 | 7 | — | — | — | Simple quenching | 1.00 | — | SUJ2 |
| A-2 | 0.85 | 0.20 | 4.25 | 4.10 | 6 | — | — | — | Simple quenching | 0.85 | — | M50 |
| Comparative example | | | | | | | | | | | | |
| B-1 | 0.52 | 0.45 | 0.88 | 1.20 | 9 | — | — | — | Carbonitriding | 0.98 | 0.34 | Less Si |
| B-2 | 0.28 | 0.65 | 1.12 | 1.50 | 9 | — | — | — | Carbonitriding | 0.95 | 0.38 | Less Si |
| B-3 | 0.45 | 1.68 | 0.97 | 1.05 | 7 | — | — | — | Carbonitriding | 0.95 | 0.58 | Much Si |
| B-4 | 0.33 | 0.98 | 0.43 | 1.34 | 8 | — | — | — | Carbonitriding | 1.05 | 0.88 | Less Mo |
| B-5 | 0.65 | 0.88 | 1.60 | 1.36 | 10 | — | — | — | Carbonitriding | 0.98 | 0.32 | Much Mo |
| B-6 | 0.42 | 1.00 | 0.99 | 0.42 | 8 | — | — | — | Carbonitriding | 0.99 | 0.35 | Less Cr |
| B-7 | 1.25 | 0.95 | 1.25 | 0.88 | 9 | 0.15 | Present | 0.038 | Simple quenching | 1.25 | — | Much C in material |
| B-8 | 0.45 | 0.88 | 1.5 | 2.08 | 7 | — | — | — | Carbonitriding | 0.96 | 0.28 | Much Cr |
| B-9 | 0.98 | 1.01 | 0.68 | 1.50 | 13 | 0.25 | Present | 0.061 | Simple quenching | 0.98 | — | Much O |
| B-10 | 0.88 | 0.98 | 1.18 | 1.23 | 8 | 0.07 | Present | 0.032 | Simple quenching | 0.88 | — | Less Ti |
| B-11 | 1.05 | 0.95 | 1.67 | 0.99 | 7 | 0.35 | Present | 0.036 | Simple quenching | 1.05 | — | Much Ti |
| B-12 | 0.42 | 1.01 | 0.98 | 1.45 | 7 | — | — | — | Carbonitriding | 1.32 | 0.28 | Much C after heat treatment |
| B-13 | 0.42 | 1.01 | 0.98 | 1.45 | 7 | — | — | — | Carbonitriding | 0.75 | 0.31 | Less C after heat treatment |
| B-14 | 0.42 | 1.01 | 0.98 | 1.45 | 7 | — | — | — | Carbonitriding | 0.98 | 0.09 | Less N after heat treatment |

TABLE 1-continued

| | | Alloying elements (wt %) | | | | | Proper solution heat treatment | Minimum precipitated substances (TiC) size (μm) | Heat treatment | | | |
|---|---|---|---|---|---|---|---|---|---|---|---|---|
| No. | C | Si | Mo | Cr | O (ppm) | Ti | | | Treatment | Surface C % | Surface N % | Contents |
| B-15 | 0.94 | 1.02 | 0.88 | 1.52 | 6 | | | | Carbonitriding | 1.18 | 0.17 | Less N after heat treatment |
| B-16 Example | 1.02 | 1.04 | 0.98 | 1.48 | 8 | 0.16 | Absent | 0.13 | Simple quenching | 1.02 | — | Non solution treatment |
| C-1 | 0.46 | 0.74 | 1.02 | 1.50 | 8 | — | — | — | Carbonitriding | 1.18 | 0.28 | |
| C-2 | 0.98 | 1.35 | 1.39 | 1.52 | 6 | 0.16 | Present | 0.029 | Simple quenching | 0.98 | — | |
| C-3 | 0.26 | 1.12 | 0.56 | 1.75 | 11 | — | — | — | Carbonitriding | 0.93 | 0.48 | |
| C-4 | 0.83 | 1.2 | 0.85 | 1.05 | 7 | 0.28 | Present | 0.018 | Simple quenching | 0.83 | — | |
| C-5 | 0.65 | 0.95 | 1.25 | 0.58 | 10 | — | — | — | Carbonitriding | 1.02 | 0.68 | |
| C-6 | 1.16 | 0.86 | 0.88 | 0.75 | 10 | 0.21 | Present | 0.028 | Simple quenching | 1.16 | — | |
| C-7 | 1.04 | 1.25 | 0.88 | 0.99 | 8 | 0.12 | Present | 0.033 | Simple quenching | 1.04 | — | |
| C-8 | 0.42 | 1.01 | 0.98 | 1.45 | 7 | — | — | — | Carbonitriding | 0.97 | 0.38 | |
| C-9 | 0.94 | 1.02 | 0.88 | 1.52 | 6 | | | | Carbonitriding | 1.15 | 0.23 | |
| C-10 | 1.02 | 1.04 | 0.98 | 1.48 | 8 | 0.16 | Present | 0.029 | Simple quenching | 1.02 | — | |

Figure 2A:
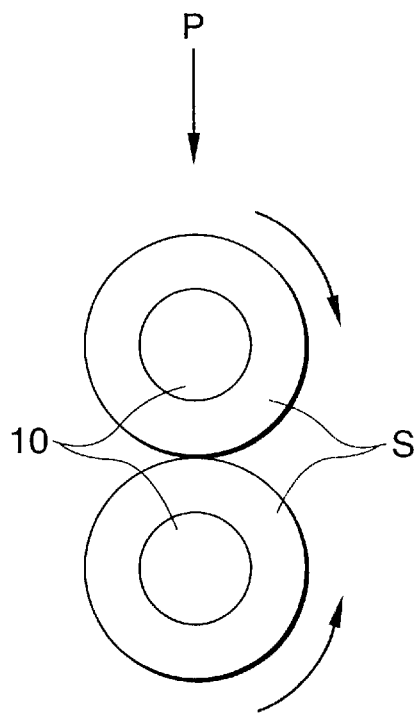
FIG. 2A is a front view showing the abrasion testing machine of two cylinders used in the abrasion test.
Figure 2B:
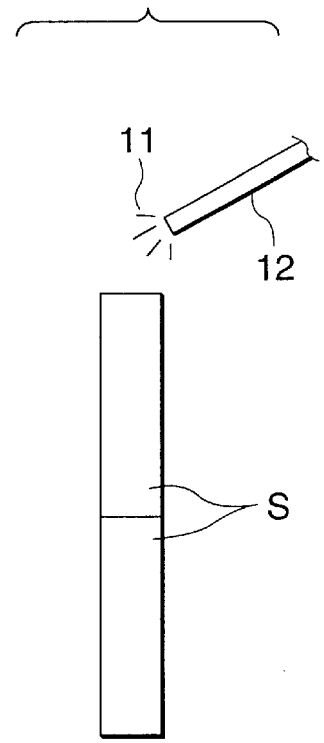
FIG. 2B is a side view showing the abrasion testing machine of two cylinders used in the abrasion test.

*No solution treatment was performed on materials not added with Ti intentionally The heat treated samples S were, in one pair made of two, subjected to the abrasion testing machine of two cylinders as shown in FIGS. 2A and 2B, and were abrasion-tested under conditions.

This testing machine is composed of rotating shafts 10 for rotating oppositely two contacting cylindrical testing materials S, a load effecting unit (not shown) for giving load P to an upper testing material from the upper side, and a lubricant supply unit 12 for dropping a lubricant to the upper testing material. The two testing materials S are contact-rotated, and are measured at abrasion amount on the surfaces thereof, giving predetermined surface pressure therebetween, at predetermined sliding rate and until coming to a predetermined sliding distance. The tested results are valued at the abrasion amount (g/m) per 1 m of the sliding distance.

[Abrasion Testing Conditions]

Sizes of the cylindrical testing material: 30 mm outer diameter, 7 mm thickness and 10 mm length Roughness on the surface: Ra 0.008 to 0.01 μm Rotation speed of rotating shaft at the driving side: 10 rpm Rotation speed of rotating shaft at the following side: 7 rpm Sliding rate: 30%

Lubricant: spindle oil #10

Testing temperature: room temperature (20° C.)

Surface pressure: 120 kgf/mm²

Sliding distance: 3000 m

As to the seizing resistance, balls of 9.525 mm diameter were formed with the steel materials of the compositions shown in Table 1, and the heat treatment as shown in Table 1 was carried out on each of balls. One pair was made of four heat treated balls, and the friction- tests of four balls (see JISK2519, etc.) were carried out under the following conditions.

Figure 3A:
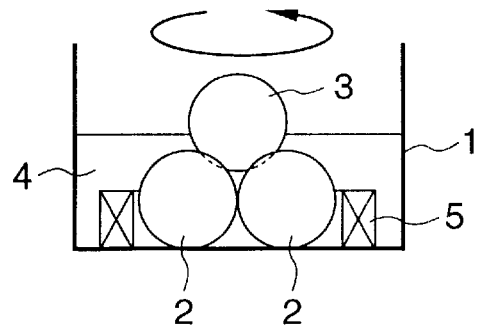
FIG. 3A is a cross sectional view for explaining the abrasion testing method of four balls.
Figure 3B:
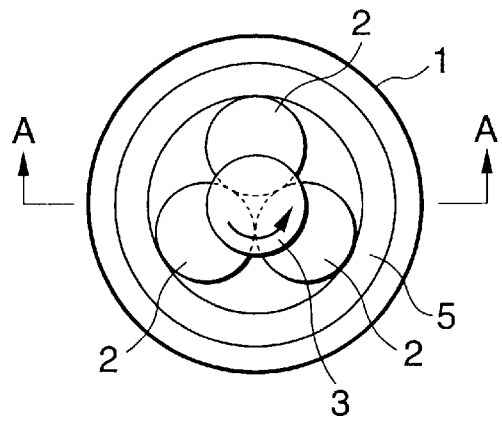
FIG. 3B is a plane view for explaining the abrasion testing method of four balls.

As shown in FIGS. 3A and 3B, three balls of one pair made of four balls are placed in contact as fixed balls 2 on a bottom of an oil bath 1, and one ball is put on a concave centrally formed with the three fixed balls 2. This one ball is a rotating ball 3. A lubricant oil 4 is charged at height of half of the rotating ball 3. The three fixed balls 2 are supported not to rotate by a supporting member 5 in the oil bath 1. FIG. 3A is a side view showing the placements of the fixed balls 2 and the rotating ball 3 in the height of the oil bath 1. In FIG. 3A, the supporting member 5 is shown in cross section seen from A—A in FIG. 3B.

The load exerting between the fixed balls 2 and the rotating ball 3 was changed under the condition that the rotating ball 3 is rotated at fixed rotation number, and a load where torque abruptly rose was measured as a seizing load.

[The Seizing Test Condition]

Rotation number: 8000 rpm

Lubricant oil: spindle oil #10

Testing temperature: room temperature (20° C.)

Results of the abrasion test and the seizing test are shown in Table 2. FIGS. 4 to 13 show in graphs the percentages of the elements (Si, Mo, Cr and Ti) contained in the used steel materials, or the surface nitrogen concentration and relations between the abrasion amounts obtained in the abrasion tests and the seizing load obtained in the seizing tests.

TABLE 2

| | No. | Abrasion tested results of two cylinders Abrasion amount (g/m) per 1 m of sliding distance | Tested results of four balls |
|---|---|---|---|
| Conventional example | A-1 | 0.0070 | 35.2 |
| | A-2 | 0.0014 | 36.1 |
| Comparative example | B-1 | 0.0031 | 45.3 |
| | B-2 | 0.0027 | 49.3 |
| | B-3 | 0.0015 | 91.2 |
| | B-4 | 0.0029 | 47.8 |
| | B-5 | 0.0016 | 82.6 |
| | B-6 | 0.0031 | 46.0 |
| | B-7 | 0.0015 | 85.3 |
| | B-8 | 0.0019 | 79.6 |
| | B-9 | 0.0017 | 90.2 |
| | B-10 | 0.0036 | 42.5 |
| | B-11 | 0.0014 | 92.6 |
| | B-12 | 0.0012 | 94.2 |
| | B-13 | 0.0028 | 52.4 |
| | B-14 | 0.0045 | 38.2 |
| | B-15 | 0.0035 | 45.2 |
| | B-16 | 0.0049 | 37.5 |
| Example | C-1 | 0.0021 | 78.3 |
| | C-2 | 0.0014 | 93.8 |

TABLE 2-continued

| No. | Abrasion tested results of two cylinders Abrasion amount (g/m) per 1 m of sliding distance | Tested results of four balls |
| --- | --- | --- |
| C-3 | 0.0021 | 70.4 |
| C-4 | 0.0018 | 74.3 |
| C-5 | 0.0022 | 72.4 |
| C-6 | 0.0023 | 73.6 |
| C-7 | 0.0022 | 71.5 |
| C-8 | 0.0019 | 92.3 |
| C-9 | 0.0016 | 87.6 |
| C-10 | 0.0017 | 79.7 |

Figure 4:
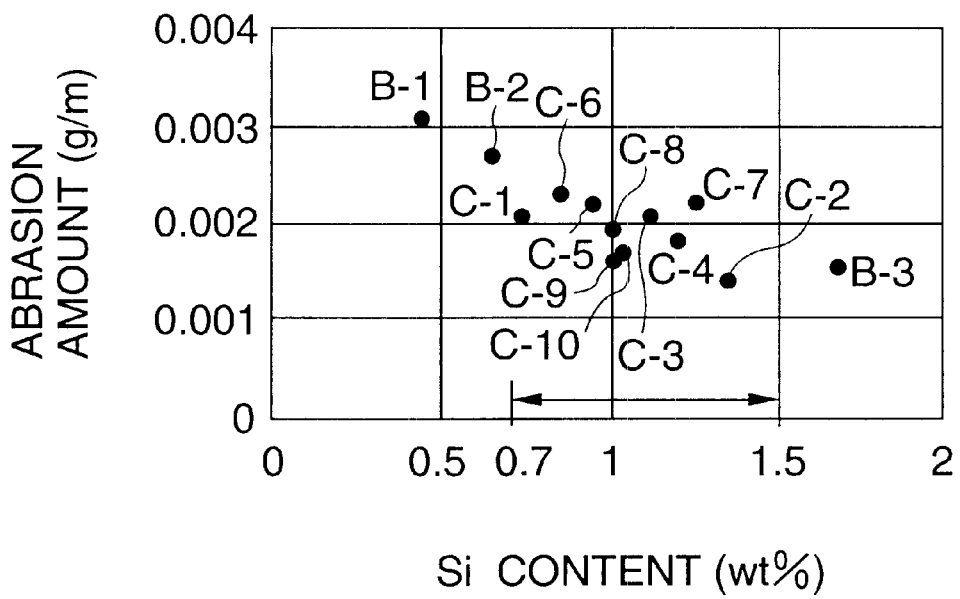
FIG. 4 is a graph showing the relation between the Si content in steel material and the abrasion amount based on results of the abrasion test.
Figure 5:
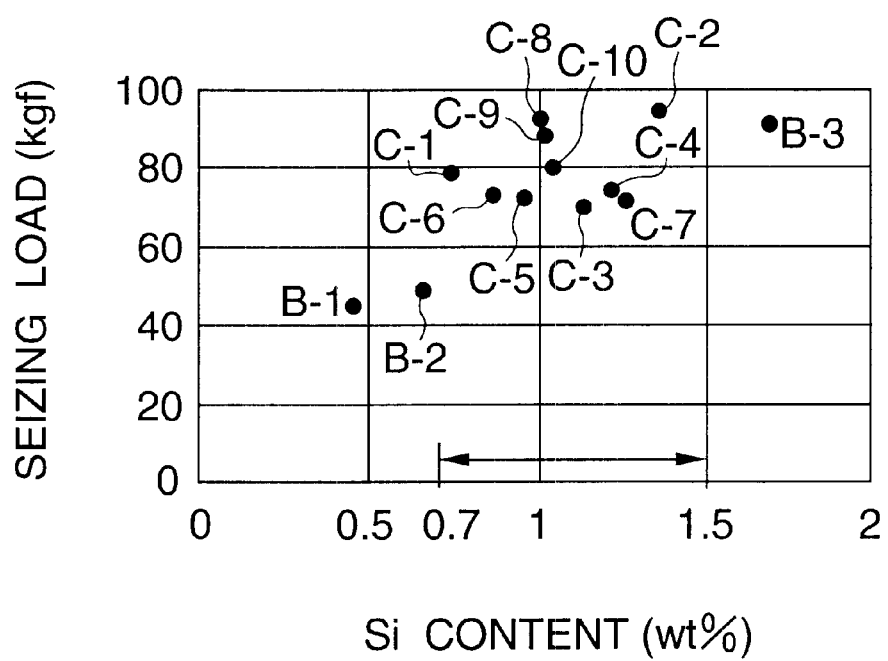
FIG. 5 is a graph showing the relation between the Si content in steel material and the seizing load based on results of the seizing test.

FIG. 4 is a graph showing the relation between the Si content in the used steel material and the abrasion amount obtained in the abrasion test. FIG. 5 is a graph showing the relation between the Si content in the used steel material and the seizing load obtained in the seizing test. These graphs include only results of the tested materials satisfying the ranges according to the present invention other than the Si content. Therefore, from these graphs, influences the Si contents give to the abrasion resistance and the seizing resistance can be seen.

It is seen in FIG. 4 that the more the Si contents, the less the abrasion amount, and the abrasion resistance is improved. It is seen in FIG. 5 that the more the Si content, the larger the seizing load, and the seizing resistance is improved. In particular, when the Si content is 0.7 wt % or more, the seizing resistance is by far improved. Even if the Si content exceeds 1.5 wt %, the effects by the Si addition are not large in both the abrasion resistance and the seizing resistance, but it is saturated. Therefore, the range of 0.7 to 1.5 wt % of the Si content is proper for improving the abrasion resistance and the seizing resistance.

Figure 6:
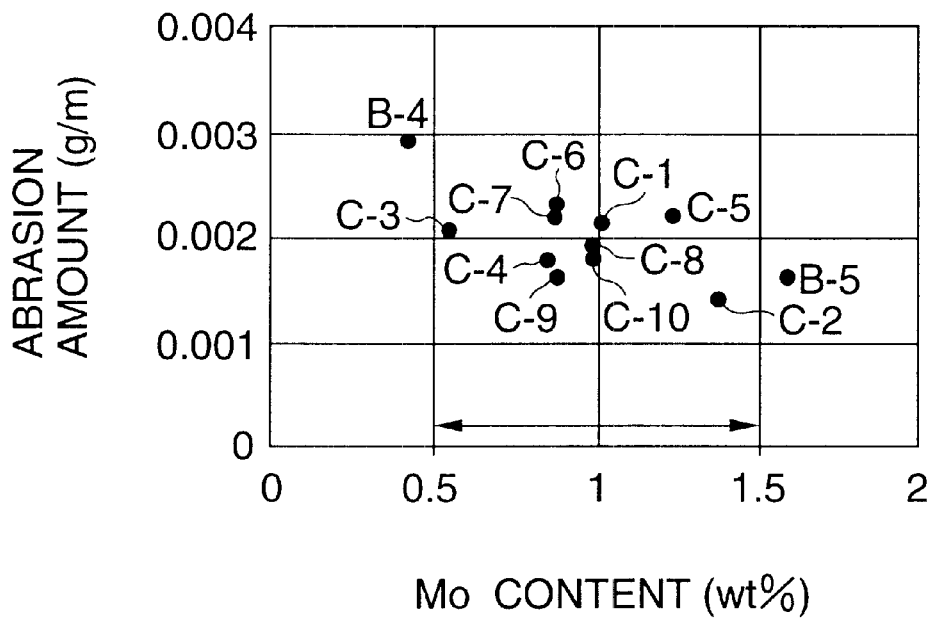
FIG. 6 is a graph showing the relation between the Mo content in steel material and the abrasion amount based on results of the abrasion test.
Figure 7:
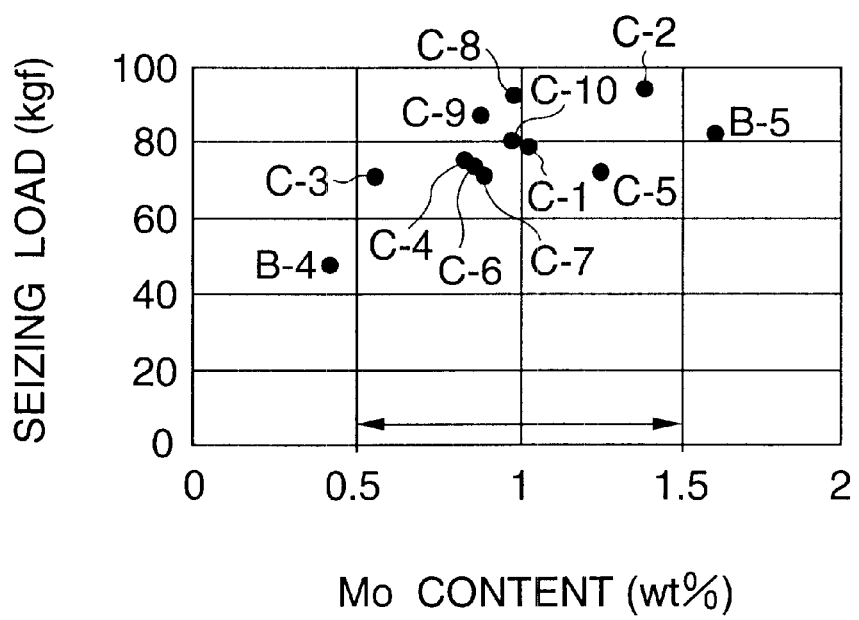
FIG. 7 is a graph showing the relation between the Mo content in steel material and the seizing load based on results of the seizing test.

FIG. 6 is a graph showing the relation between the Mo content in the used steel material and the abrasion amount obtained in the abrasion test. FIG. 7 is a graph showing the relation between the Mo content in the used steel material and the seizing load obtained in the seizing test. These graphs include only results of the tested materials satisfying the ranges according to the present invention other than the Mo content. Therefore, from these graphs, influences the Mo contents give to the abrasion resistance and the seizing resistance can be seen.

It is seen in FIG. 6 that the more the Mo contents, the less the abrasion amount, and the abrasion resistance is improved. In particular, when the Mo content is 0.5 wt % or more, the abrasion resistance is considerably improved. It is seen from FIG. 7 that the more the Mo content, the larger the seizing load, and the seizing resistance is improved. In particular, when the Mo content is 0.5 wt % or more, the seizing resistance is considerably improved. Even if the Mo content exceeds 1.5 wt %, the effects by the Mo addition are not large in both the abrasion resistance and the seizing resistance, but it is saturated. Therefore, the range of 0.5 to 1.5 wt % of the Si content is proper for improving the abrasion resistance and the seizing resistance.

Figure 8:
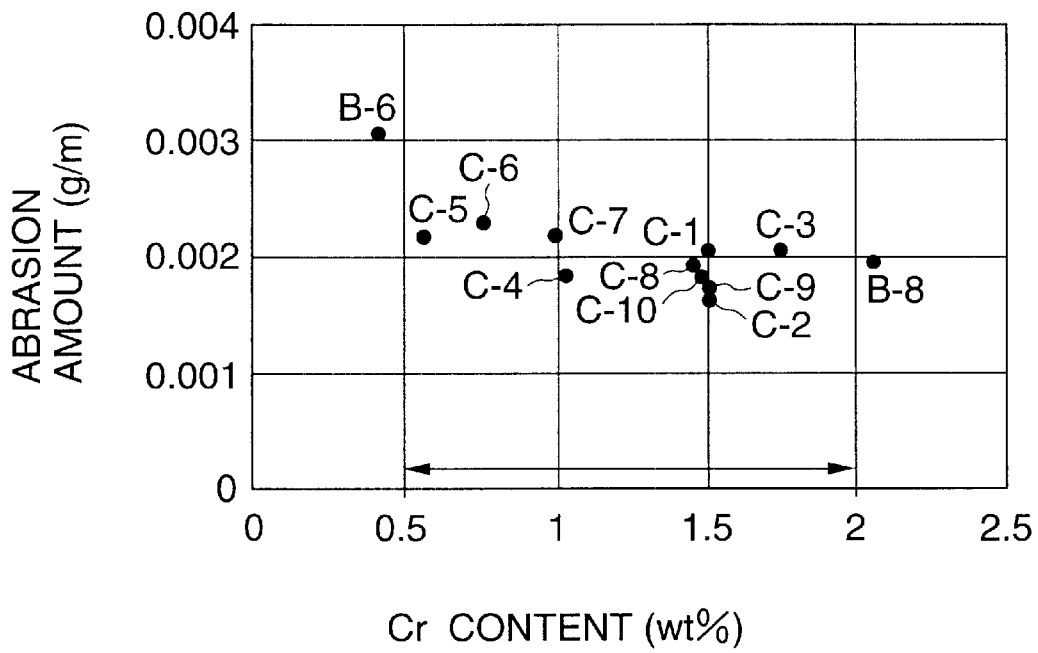
FIG. 8 is a graph showing the relation between the Cr content in steel material and the abrasion amount based on results of the abrasion test.
Figure 9:
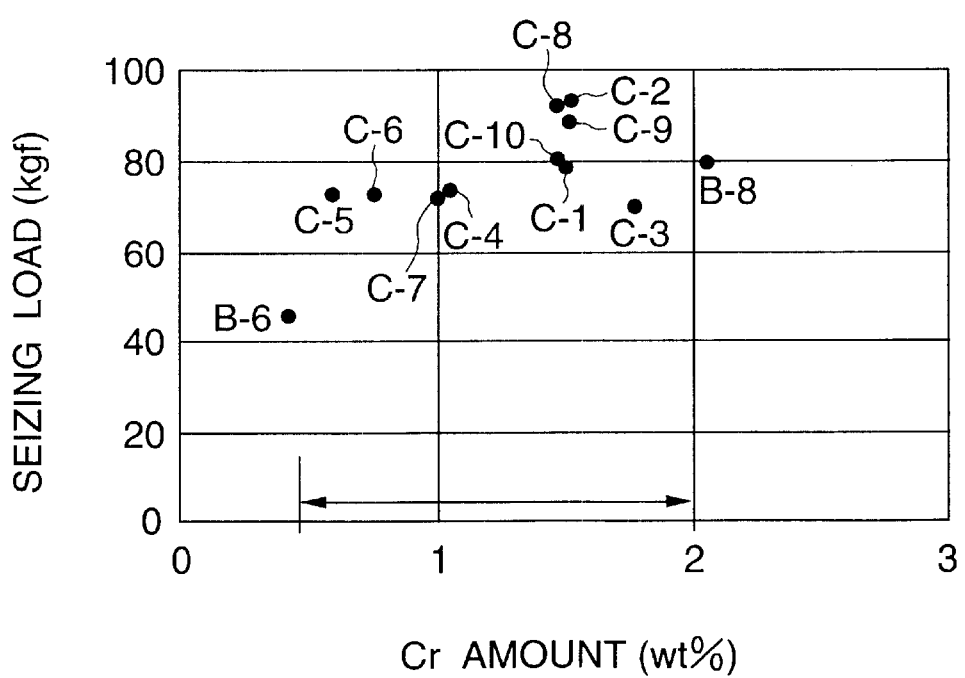
FIG. 9 is a graph showing the relation between the Cr content in steel material and the seizing load based on results of the seizing test.

FIG. 8 is a graph showing the relation between the Cr content in the used steel material and the abrasion amount obtained in the abrasion test. FIG. 9 is a graph showing the relation between the Cr content in the used steel material and the seizing load obtained in the seizing test. These graphs include only results of the tested materials satisfying the ranges according to the present invention other than the Cr content. Therefore, from these graphs, influences of the Cr contents give to the abrasion resistance and the seizing resistance can be seen.

It is seen in FIG. 8 that the more the Cr contents, the less the abrasion amount, and the abrasion resistance is improved. In particular, when the Cr content is 0.5 wt % or more, the abrasion resistance is considerably improved. It is seen from FIG. 9 that the more the Cr content, the larger the seizing load, and the seizing resistance is improved. In particular, when the Cr content is 0.5 wt % or more, the seizing resistance is considerably improved.

Figure 10:
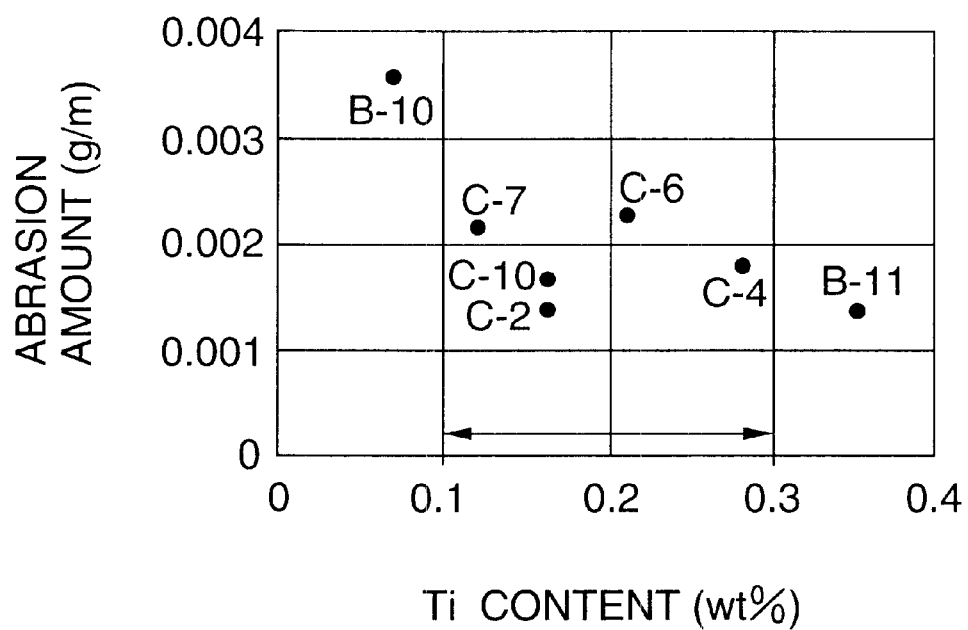
FIG. 10 is a graph showing the relation between the Ti content in steel material and the abrasion amount based on results of the abrasion test.
Figure 11:
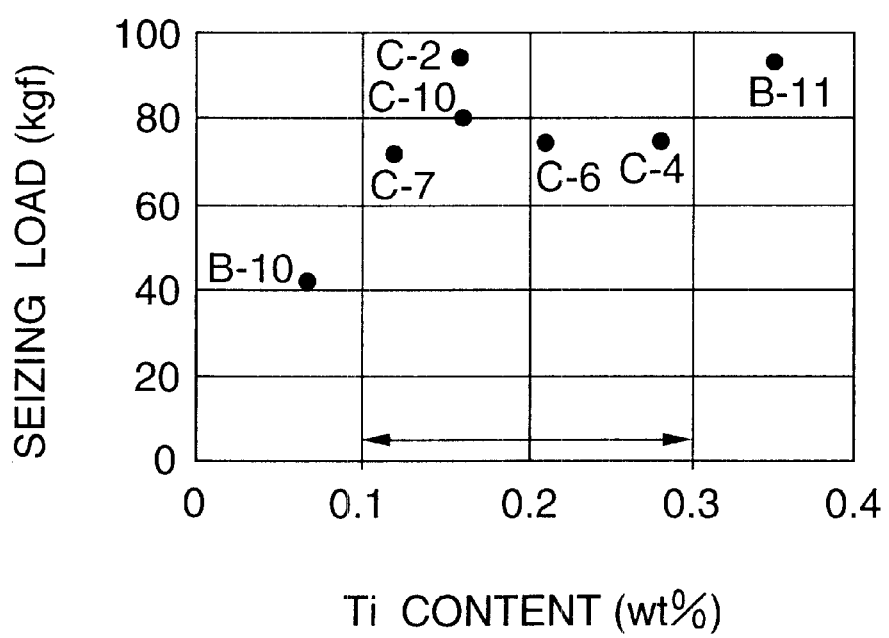
FIG. 11 is a graph showing the relation between the Ti content in steel material and the seizing load based on results of the abrasion test.

FIG. 10 is a graph showing the relation between the Ti content in the used steel material and the abrasion amount obtained in the abrasion test. FIG. 11 is a graph showing the relation between the Ti content in the used steel material and the seizing load obtained in the seizing test. These graphs include only results of the tested materials satisfying the inventive ranges other than the Ti content. This graph does not include the result of the material No. B-16 where the Ti content falls within the range according to the present invention but the sizes of the precipitated TiC are over 0.1 μm. Therefore, from these graphs, influences of the Ti contents give to the abrasion resistance and the seizing resistance can be seen.

It is seen in FIG. 10 that the more the Ti contents, the less the abrasion amount, and the abrasion resistance is improved. In particular, when the Ti content is 0.1 wt % or more, the abrasion resistance is considerably improved. It is seen from FIG. 11 that the more the Ti content, the larger the seizing load, and the seizing resistance is improved. In particular, when the Ti content is 0.1 wt % or more, the seizing resistance is considerably improved.

When the result of the material No.B-16 shown in Table 3 is compared with the results of the materials No.C-2 and C-10 where the Ti content is the same but the sizes of the precipitated TiC are 0.1 μm or less, B-16 is remarkably larger in the abrasion amount than C-2 and C-10 and is by far smaller in the seizing load. That is, if the size of the precipitated TiC is 0.1 μm or less, it is seen that the abrasion resistance and the seizing resistance are remarkably improved than a case that the size of the precipitated TiC exceeds 0.1 μm. Thus, the definition that the size of the precipitated TiC is 0.1 μm or less is proper for improving the abrasion resistance and the seizing resistance.

Figure 12:
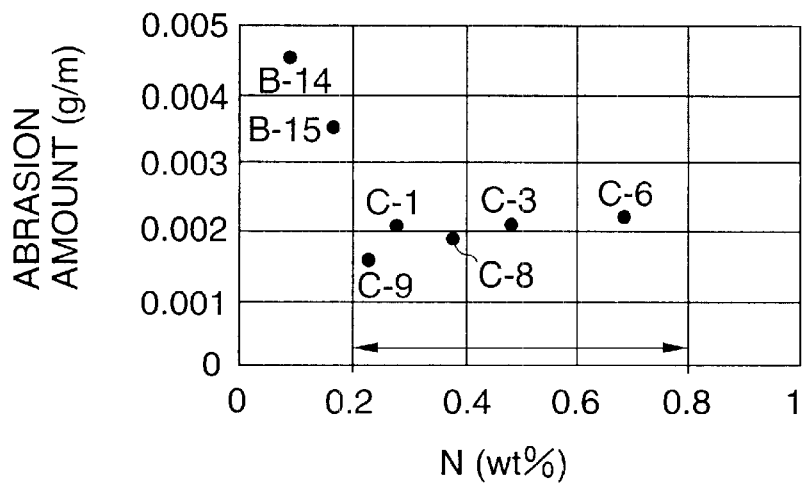
FIG. 12 is a graph showing the relation between the surface nitrogen concentration and the abrasion amount based on results of the abrasion test.
Figure 13:
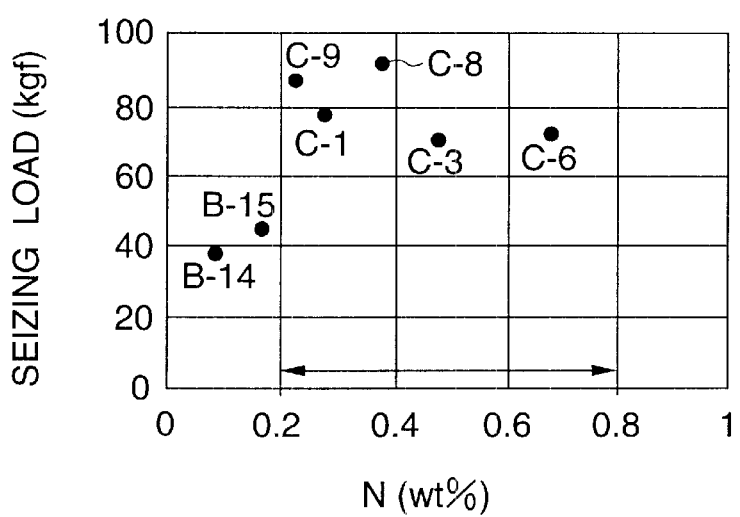
FIG. 13 is a graph showing the relation between the surface nitrogen concentration and the seizing load based on results of the seizing test.

FIG. 12 is a graph showing the relation between the surface nitrogen concentration (N) and the abrasion amount obtained in the abrasion test. FIG. 13 is a graph showing the relation between the surface nitrogen concentration (N) and the seizing load obtained in the seizing test. These graphs include only results of the tested materials satisfying the ranges according to the present invention other than the surface nitrogen concentration. Therefore, from these graphs, influences of the surface nitrogen concentration gives to the abrasion resistance and the seizing resistance can be seen.

It is seen from the graph in FIG. 12 that the more the surface nitrogen concentration, the less the abrasion amount, and the abrasion resistance is improved. In particular, when the surface nitrogen concentration is 0.2 wt % or more, the abrasion resistance is considerably improved. It is seen from FIG. 13 that the more the surface nitrogen concentration, the larger the seizing load, and the seizing resistance is improved. In particular, when the surface nitrogen concentration is 0.2 wt % or more, the seizing resistance is considerably improved. Even if the surface nitrogen concentration exceeds 0.8 wt %, the effects by the abrasion resistance and seizing resistance are not large, but are saturated. Therefore, the range of 0.2 to 0.8 wt % of the surface nitrogen concentration is proper for improving the abrasion resistance and the seizing resistance.

[Experiments for Examining the Rolling Fatigue Life]

Disc shaped testing pieces of 60 mm outer diameter and 6 mm thickness were produced with the steel materials of the compositions shown in Table 1, and the heat treatment as shown in Table 1 was carried out on each of the test pieces. Subsequently, these test pieces-were incorporated in the thrust testing machine described in "Tokushukoh Binran (1st Ed.)" (Ed. by Denkiseikokenkyusho, Rikogakusha, May 25, 1965, pp.10 to 21), and the rolling fatigue life of each testing piece was examined by means of the ball of 9.525 mm diameter by rotating tests under the following conditions.

[The Examining Condition of the Rolling Fatigue Life]

The lubricating way: the oil bath
The lubricating oil: FBK oil RO68
Maximum surface pressure: 530 kg/mm$^2$
Stress repeating number: 3000 cpm Results of examining the rolling fatigue file (L10life) are shown in Table 3.

TABLE 3

| | No. | L10 Lives (×106 cycles) |
|---|---|---|
| Conventional example | A-1 | 10.1 |
| | A-2 | 7.4 |
| Comparative example | B-1 | 10.2 |
| | B-2 | 17.2 |
| | B-3 | 21.3 |
| | B-4 | 15.4 |
| | B-5 | 12.6 |
| | B-6 | 11.3 |
| | B-7 | 2.4 |
| | B-8 | 3.3 |
| | B-9 | 4.9 |
| | B-10 | 12.2 |
| | B-11 | 4.1 |
| | B-12 | 3.8 |
| | B-13 | 5.3 |
| | B-14 | 13.4 |
| | B-15 | 15.2 |
| | B-16 | 8.1 |
| Example | C-1 | 17.7 |
| | C-2 | 14.2 |
| | C-3 | 24.3 |
| | C-4 | 16.5 |
| | C-5 | 21.7 |
| | C-6 | 16 |
| | C-7 | 20.4 |
| | C-8 | 26.3 |
| | C-9 | 29.1 |
| | C-10 | 19.7 |

As seen from these results, when the C content in the used steel material is higher than 1.2 wt % (Material No.B-7), when the Cr content in the steel material is higher than 2.0 wt % (Material No.B-8), when the O content in the steel material is higher than 12 ppm(Material No.B-9), when the Ti content in the steel material is higher than 0.3 wt % (Material No.B-11), when the surface carbon concentration is higher than 0.8 wt % (Material No.B-13), when the surface carbon concentration is higher than 1.3 wt % (Material No.B-12), when the size of the precipitated TiC surface is higher than 0.1 μm (Material No.B-16), the rolling fatigue life is lower than the conventional case (Material No.A-1). The causes of these lower rolling fatigue lives are as already explained.

The rolling fatigue lives of the experimented examples (Comparative and Embodied examples) other than the above mentioned are longer than the conventional example (Material No.A-1), In particular, in Materials Nos.C-8 and C-9, longer rolling fatigue lives than the cycle of 25×10$^6$ are obtained.

Results of these three tests are shown in Table 4.

TABLE 4

| | No. | Abrasion resistance | Seizing resistance | Rolling lives |
|---|---|---|---|---|
| Conventional example | A-1 | x | x | ○ |
| | A-2 | ○ | x | Δ |
| Comparative example | B-1 | Δ | x | ○ |
| | B-2 | ○ | x | ○ |
| | B-3 | ○ | ○ | ○ |
| | B-4 | ○ | x | ○ |
| | B-5 | ○ | ○ | ○ |
| | B-6 | Δ | x | ○ |
| | B-7 | ○ | ○ | x |
| | B-8 | ○ | ○ | x |
| | B-9 | ○ | ○ | x |
| | B-10 | Δ | x | ○ |
| | B-11 | ○ | ○ | x |
| | B-12 | ○ | ○ | x |
| | B-13 | ○ | Δ | x |
| | B-14 | Δ | x | ○ |
| | B-15 | Δ | x | ○ |
| | B-16 | Δ | x | ○ |
| Example | C-1 | ○ | ○ | ○ |
| | C-2 | ○ | ○ | ○ |
| | C-3 | ○ | ○ | ○ |
| | C-4 | ○ | ○ | ○ |
| | C-5 | ○ | ○ | ○ |
| | C-6 | ○ | ○ | ○ |
| | C-7 | ○ | ○ | ○ |
| | C-8 | ○ | ○ | ○ |
| | C-9 | ○ | ○ | ○ |
| | C-10 | ○ | ○ | ○ |

As seen from this Table, in the Examples satisfying all of the numerical limits according to the present invention, goods results are obtained in each of the abrasion resistance, the seizing resistance and the rolling fatigue lives (rolling lives). In the Comparative examples not satisfying any of the numeral limitations according to the present invention, goods results are not obtained in any of the abrasion resistance, the seizing resistance and the rolling fatigue lives, excepting Materials Nos.B-3 and B-5. As to Material No.B-3, the Si content exceeds the range according to the present invention, and since it is too high, the workability is low, and a problem exists about the productivity. As to Material No.B-5, the Mo content is over the inventive range, and since Mo is expensive, a problem exists about high production cost. In contrast, the Examples according to the present invention can decrease the production cost.

Thus, if the exemplified rolling bearings of the present invention are used at the high speed rotation of the $d_m n$ value exceeding $1.0 \times 10^6$, the abrasion and the seizing are reduced, and the rolling fatigue life is long, lowering the production cost.

The above described examples are described with respect to the rolling bearings satisfying any one of the structures of the first and second aspect. However, the present invention is not limited thereto and also includes such structures where the bearing members fabricated with Ti containing steel material are treated with carbonitriding and precipitated with TiCN on the surface. In this case, the surface precipitated TiCN brings about the effect (2), and accordingly the size of the precipitated TiCN is 0.1 μm or less.

As described above, according to the inventive rolling bearing, the abrasion resistance and the seizing resistance are remarkably improved, which were problems in the use at the high speed rotation of $1.0 \times 10^6$ or more of the $D_m n$ value, enabling to lower the production cost.

What is claimed is:

1. A rolling bearing comprising an inner race, an outer race and plural rolling elements, in which at least one of said inner race, said outer race and said rolling elements comprises an alloy steel containing: 0.2 to 1.2 wt % of C; 0.7 to 1.5 wt % of Si; 0.5 to 1.5 wt % of Mo; 0.5 to 2.0 wt % of Cr; 0.1 to 0.3 wt % of Ti and 12 ppm or less of O; wherein said at least one of said inner race, said outer race and said rolling elements has been solution heat-treated, and thereafter, quenched and tempered so that TiC having a size of 0.1 µm or less is precipitated on a rolling surface of said at least one of said inner race, said outer race and said rolling elements.

2. The rolling bearing according to claim 1, wherein the $d_m n$ product of said rolling bearing is greater than or equal to $1.0 \times 10^6$, wherein $d_m$ represents an average size of an inner diameter and an outer diameter of said rolling bearing, and n represents the number of rotations per minute.

3. A rolling bearing comprising an inner race, an outer race and plural rolling elements, in which at least one of said inner race, said outer race and said rolling elements comprises an alloy steel containing: 0.2 to 1.2 wt % of C; 0.7 to 1.5 wt % of Si; 0.5 to 1.5 wt % of Mo; 0.5 to 2.0 wt % of Cr; 0.1 to 0.3 wt % of Ti and 12 ppm or less of O; wherein at least one of said inner race, said outer race and said rolling elements has been solution heat-treated, carbonitrided, quenched and tempered, so that TiC having a size of 0.1 µm or less is precipitated on a rolling surface of said at least one of said inner race, said outer race and said rolling elements, carbon concentration on a surface of at least one of said inner race, said outer race and said rolling elements is in the range of 0.8 to 1.3 wt % and nitrogen concentration on the surface of at least one of said inner race, said outer race and said rolling elements is in the range of 0.2 to 0.8 wt %.

4. The rolling bearing according to claim 3, wherein the $d_m n$ product of said rolling bearing is greater than or equal to $1.0 \times 10^6$, wherein $d_m$ represents an average size of an inner diameter and an outer diameter of said rolling bearing, and n represents the number of rotations per minute.

5. The rolling bearing according to claim 3, wherein said at least one of said inner race, said outer race and said rolling elements has been solution heat-treated at a temperature of at least 1150° C. for at least 1 hour.

6. The rolling bearing according to claim 3, wherein said at least one of said inner race, said outer race and said rolling elements has been solution heat-treated at a temperature greater than 1150° C. and less than or equal to 1350° C.

7. The rolling bearing according to claim 3, wherein said at least one of said inner race, said outer race and said rolling elements has been solution heat-treated for a period of time greater than 1 hour and less than or equal to 3 hours.

8. A rolling bearing comprising an inner race, an outer race and plural rolling elements, in which at least one of said inner race, said outer race and said rolling elements comprises an alloy steel containing: 0.2 to 1.2 wt % of C; 0.7 to 1.5 wt % of Si; 0.5 to 1.5 wt % of Mo; 0.5 to 2.0 wt % of Cr; 0.1 to 0.3 wt % of Ti and 12 ppm or less of O; wherein said at least one of said inner race, said outer race and said rolling elements has been solution heat-treated at a temperature of at least 1150° C. for at least 1 hour, and thereafter, quenched and tempered so that TiC having a size of 0.1 µm or less is precipitated on a rolling surface of said at least one of said inner race, said outer race and said rolling elements.

9. The rolling bearing according to claim 8, wherein said at least one of said inner race, said outer race and said rolling elements has been solution heat-treated at a temperature greater than 1150° C. and less than or equal to 1350° C.

10. The rolling bearing according to claim 8, wherein said at least one of said inner race, said outer race and said rolling elements has been solution heat-treated for a period of time greater than 1 hour and less than or equal to 3 hours.

11. The rolling bearing according to claim 8, wherein the $d_m n$ product of said rolling bearing is greater than or equal to $1.0 \times 10^6$, wherein $d_m$ represents an average size of an inner diameter and an outer diameter of said rolling bearing, and n represents the number of rotations per minute.

* * * * *